(12) United States Patent
Harvey et al.

(10) Patent No.: US 7,399,160 B2
(45) Date of Patent: Jul. 15, 2008

(54) TURBINE COMPONENT

(75) Inventors: Neil W Harvey, Derby (GB); Peter T Ireland, Oxford (GB); John P C W Ling, Oxford (GB)

(73) Assignee: Rolls-Royce plc, London (GB)

( * ) Notice: Subject to any disclaimer, the term of this patent is extended or adjusted under 35 U.S.C. 154(b) by 358 days.

(21) Appl. No.: 11/188,881

(22) Filed: Jul. 26, 2005

(65) Prior Publication Data
US 2006/0280607 A1 Dec. 14, 2006

(30) Foreign Application Priority Data
Aug. 25, 2004 (GB) .................................. 0418914.8

(51) Int. Cl.
*F01D 5/18* (2006.01)
(52) U.S. Cl. ..................................... 416/97 R; 415/115
(58) Field of Classification Search ................. 415/115; 416/97 R
See application file for complete search history.

(56) References Cited

U.S. PATENT DOCUMENTS

| | | | |
|---|---|---|---|
| 4,669,957 A * | 6/1987 | Phillips et al. ............ 416/97 R |
| 5,660,524 A | 8/1997 | Lee | |
| 5,993,156 A | 11/1999 | Bailly | |
| 6,033,181 A | 3/2000 | Endres | |
| 2004/0096313 A1 | 5/2004 | Harvey | |

FOREIGN PATENT DOCUMENTS

| | | |
|---|---|---|
| EP | 1 197 636 A | 4/2002 |
| GB | 2 106 996 A | 4/1983 |
| GB | 2 395 232 A | 5/2004 |

* cited by examiner

*Primary Examiner*—Igor Kershteyn
(74) *Attorney, Agent, or Firm*—W. Warren Taltavull; Manelli Denison & Selter PLLC

(57) ABSTRACT

A turbine component such as a turbine blade has a cooling chamber that is tapered. The taper induces and maintains a helical swirl that improves the cooling efficiency of the cooling process and enables the turbine component to operate at higher temperatures.

20 Claims, 7 Drawing Sheets

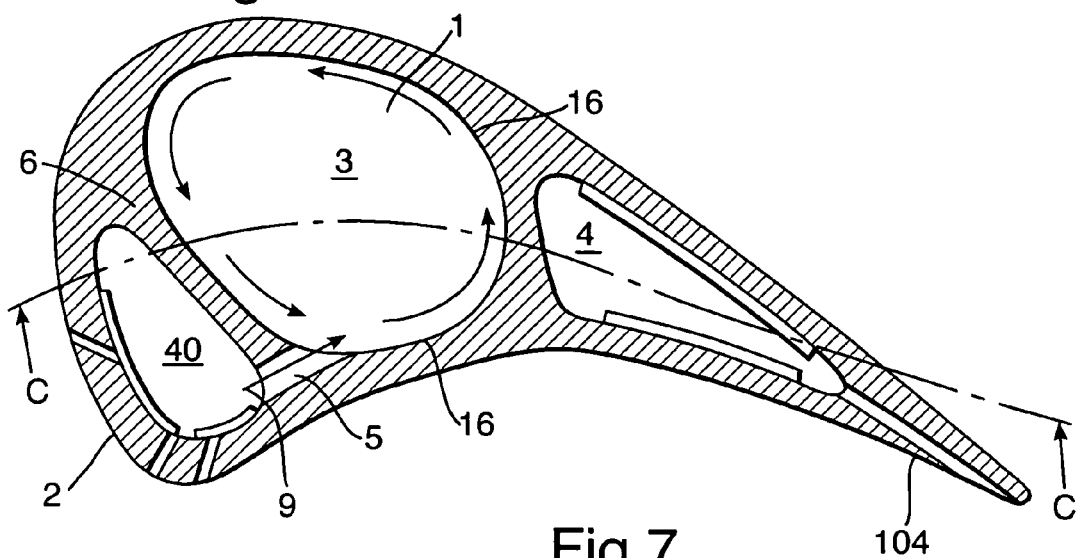
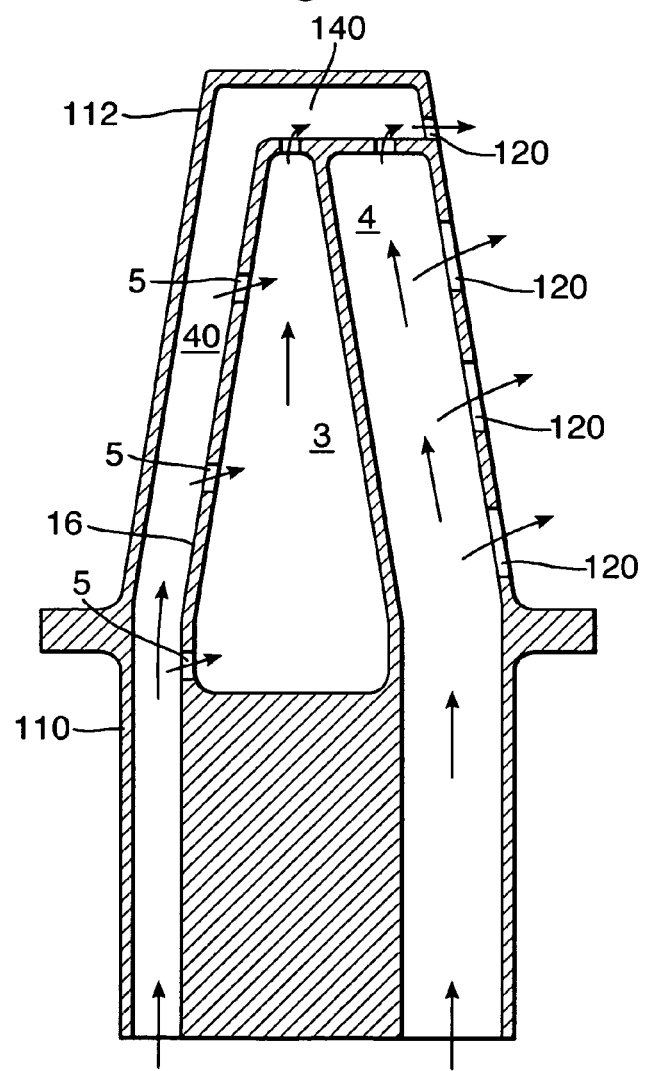

TURBINE COMPONENT

FIELD OF THE INVENTION

The present invention relates to turbine components such as turbine blades, stators or rotors, and more particularly to appropriate cooling of such turbine components in service.

BACKGROUND OF THE INVENTION

Generally, it is necessary to provide internal cooling of turbine components. To achieve high performance it is desirable to utilise high turbine entry temperatures and so greater thermal efficiencies. Unfortunately, such high turbine entry temperatures are limited by inherent characteristics of the materials from which turbine blades and vanes are made. In such circumstances, internal cooling allows components made from available materials to operate at temperatures which are close to, or exceed natural melting temperatures.

Cooling systems for turbine vanes and blades generally comprise providing a feed of cool air, taken from the compressor system in a jet engine, and feeding that cool air to the turbine blades through internal passages and chambers in order to effect cooling by a combination of internal convection and external film cooling.

SUMMARY OF THE INVENTION

The present invention principally relates to internal convection cooling where a pressurised volume of coolant air as described previously follows a number of flow or injection cross passages to cooling chambers in the vane or blade in order to provide cooling. The cool air is forced into the cooling chambers or other passages of the blade or vane due to a pressure differential between the coolant supply passage and those cooling chambers. The cooler air presented within the chambers or other passages picks up heat by convection within the chamber or passage. The warmed air is then either exhausted through an outlet passage to an exhaust passageway or returned to the supply passage or possibly released through holes in the blade surface in order to provide film cooling on external surfaces of that blade or vane.

It is an objective of the present invention to seek to increase the degree of cooling possible with respect to components such as turbine vanes and blades in order that higher thermal efficiencies through higher input temperatures can be achieved whilst using available materials with a melting point close to or below those input temperatures.

It is a further objective of the present invention to seek to provide more uniform cooling along the length of a turbine component.

Thus, according to a first aspect of the present invention there is provided a turbine component having a length extending between a root portion and a tip portion;

said component comprising a coolant chamber extending in the direction of said component length;

a fluid inlet arranged to feed fluid tangentially into said chamber;

a fluid outlet arranged to remove fluid from said chamber;

wherein the hydraulic diameter of the coolant chamber at a first point has a length $d_1$;

wherein the coolant chamber, at a distance 1 along the chamber from the first point, has a hydraulic diameter $d_2$; and wherein $$d_1(1-0.6(\frac{1}{2}d_1)) <= d_2 <= d_1(1-0.15(\frac{1}{2}d_1))$$

The first point is preferably at the fluid inlet.

The fluid inlet is preferably located towards the root of the component, the fluid outlet towards the tip of the component.

The coolant chamber may be located adjacent a leading edge of the component.

A fluid supply chamber may located adjacent the coolant chamber; the fluid inlet arranged to conduct fluid between the fluid supply chamber and the coolant chamber. The fluid supply chamber may be located adjacent the leading edge of the component.

The component may be located within an engine. The component may be a stator or a blade.

At least one further fluid inlet may be provided and arranged with the fluid inlet as an array extending in the direction of component length.

Preferably the outlet opens into a gallery located at the component tip portion.

The coolant chamber may form part of a cavity, a splitter plate being provided that extends within the cavity in the direction of component length to divide the cavity into the coolant chamber and an exhaust chamber.

The turbine component may have at least one further coolant chamber having a fluid inlet and a fluid outlet disposed such that a fluid within the at least one coolant chamber flows substantially helically between the inlet and the outlet.

According to a second aspect of the present invention there is provided a turbine component having a length extending in a radial direction between a root portion and a tip portion, said component comprising a coolant chamber extending in said radial direction;

wherein said coolant chamber is subdivided into two or more tapered portions arranged in the radial direction; and wherein each of the two or more tapered portions comprises a fluid inlet arranged to feed fluid tangentially into a respective portion.

The portions may taper in the same direction or, where the component is a static vane, in opposite directions. If the portions taper in opposite directions, a single fluid inlet can be arranged to supply fluid simultaneously to both portions.

At least one of the tapered portions may be provided with at least one further fluid inlet arranged with the first fluid inlet as an array extending in the direction of component length.

BRIEF DESCRIPTION OF THE DRAWINGS

Embodiments of the present invention will now be described by way of example only with reference to the accompanying drawings in which:

FIG. 6 is a schematic part cross-section of a portion of a turbine component in accordance with a second embodiment of the invention;

FIG. 7 is a schematic part plan cross-section of part of a turbine component in accordance with the second embodiment and consistent with that depicted in FIG. 6 in the direction C-C;

DETAILED DESCRIPTION OF THE INVENTION

Figure 1:
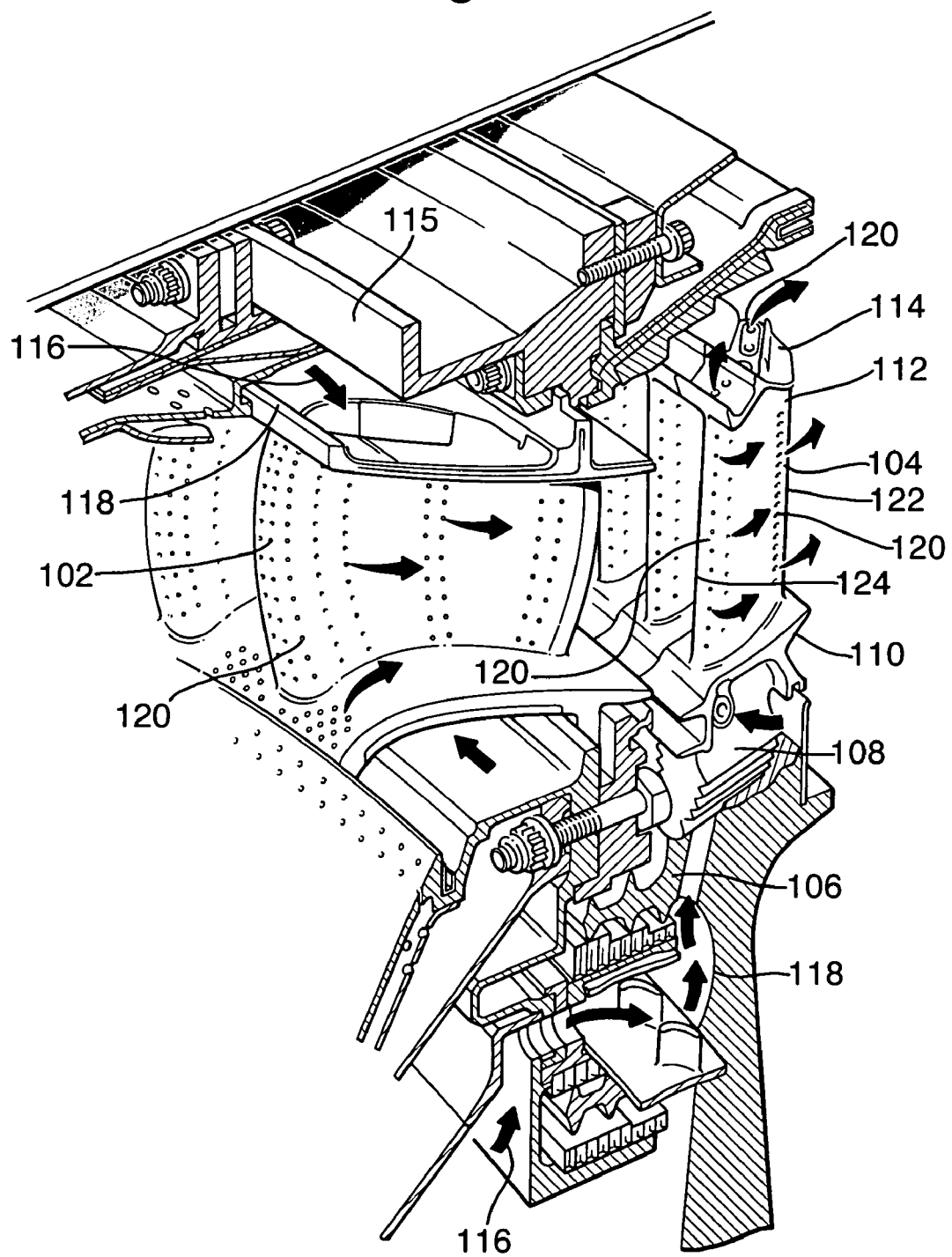
FIG. 1 is a schematic of a portion of a gas turbine engine turbine.

FIG. 1 illustrates the form of a turbine in a gas turbine engine. The turbine consists of a plurality of rotor blades 104 interleaved with a plurality of stator vanes 102. For clarity, just one set of stator vanes and one set of rotor blades are depicted. The rotor blades are fixed to a rotating hub 106 and rotate around the axis of the engine. Each blade is provided with a root 108 that attaches the blade 104 to the hub 106.

A root portion 110 is provided that consists of the root 108, a lower portion of the turbine blade 104 and the intervening structure. At the opposite end of the blade to the root is the blade tip 112. A shroud 114 may be provided to reduce the over tip leakage which would otherwise reduce the efficiency of the engine.

The stator vanes 102 are in a fixed arrangement, typically mounted to the outer casing 115 of the turbine.

Air, depicted by the arrows 116, is taken from the compressor and follows passageways 118 that pass the air to the turbine blades or vanes. Cavities or chambers within the blades and vanes carry the air around the blade or vanes until the air is exhausted through holes 120 extending through to the exterior of the blade or vane.

An increased concentration of holes may be provided at the leading edge 124, or the trailing edges 122 of the blade as the air ejected through these holes form a film around the exterior of the blade and increases the cooling effect of the air.

For a rotating blade air is injected into the component at the root. For the fixed stator vanes air may be injected at the root adjacent the hub or at the tip adjacent the engine casing.

Figure 2:
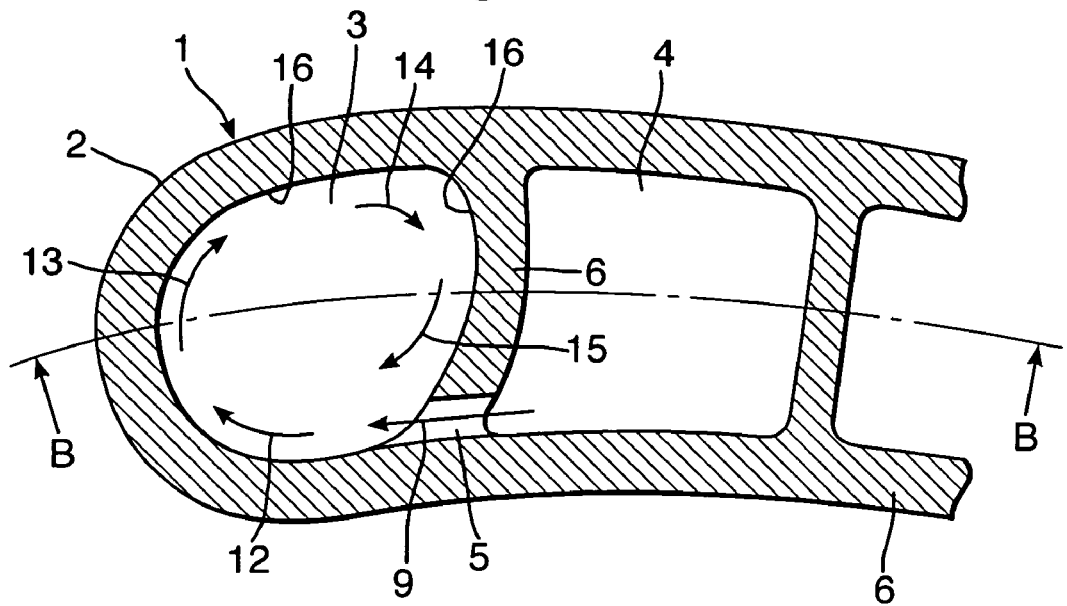
FIG. 2 is a schematic part cross-section of a portion of a turbine component in accordance with a first embodiment of the invention.
Figure 3:
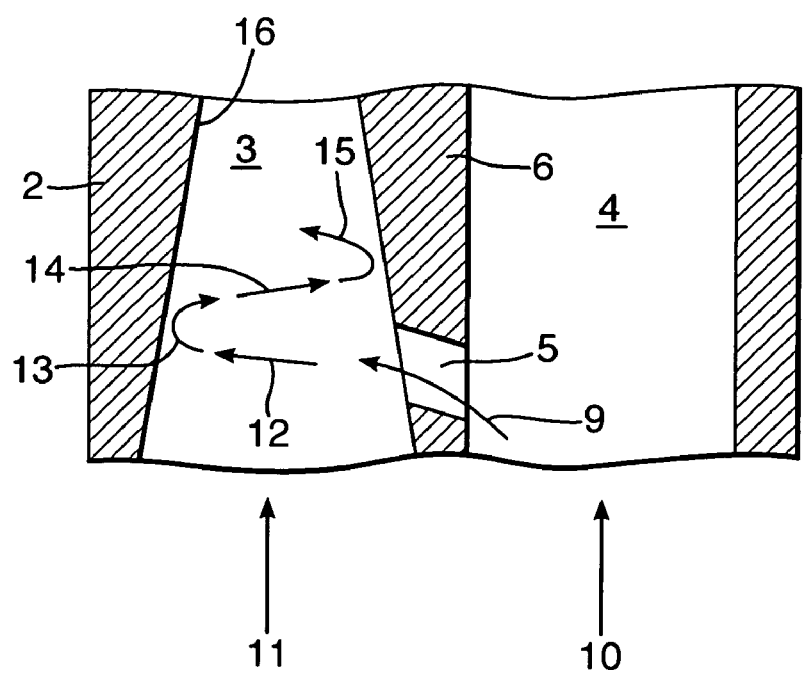
FIG. 3 is a schematic part plan cross-section of part of a turbine component in accordance with the first embodiment and consistent with that depicted in FIG. 3 in the direction B-B.

FIGS. 2 and 3 illustrate a first embodiment of the present invention.

FIG. 2 is a schematic cross-section of a component and FIG. 3 is a part plan schematic in the direction B-B from FIG. 2. Thus, the turbine component depicted is a turbine blade 1 having a leading edge 2 within which a cooling chamber 3 and a coolant passage 4 is formed. An injection passage 5 connects the cooling chamber 3 and the coolant passage 4 such that through a pressure differential, coolant, normally air, is forced through the passage 5 into the cooling chamber 3. Walls 6 define the respective chambers 3 and passages 4 and provide acceptable mechanical strength and stability for the blade 1, at minimal weight expense. The chambers and passages extend along the length of the blade between the root and the tip.

Within the chamber 3 an internal surface 16 is provided that tapers towards the tip of the blade. The internal surface is generally concave and air is fed tangentially through passage 5 into the chamber in a direction that is substantially orthogonal to the direction of chamber elongation. The passage 5 is located towards the root of the turbine blade, though a number of similar passages (not shown) are arranged at spaced intervals along the length of the chamber.

As can be seen from FIG. 3, the cooling chamber 3 tapers towards the tip of the blade. At the base of the coolant chamber, adjacent the fluid inlet, the chamber has a hydraulic diameter of $d_1$. At a distance 1 along the chamber, the chamber has a second hydraulic diameter of $d_2$.

It has been found that in situations where the function $d_1(1-0.6(\frac{1}{2}d_1)) <= d_2 <= d_1(1-0.15(\frac{1}{2}d_1))$ is satisfied, the taper angle is such that helical swirl is induced and maintained along the length of the cooling chamber.

The air flow in a rotating blade is typically from the root to the tip, as illustrated by arrows 10 for flow in the coolant passage and 11 for flow in the cooling chamber. In the coolant passage 4 the flow is typically linear from the root to the tip. In contrast, the flow in the coolant chamber 3 flows as a vortex in a spiral flow path. The air circulates generally in the direction of the taper but primarily around the inner surface of the chamber in the direction of arrows 12, 13, 14 and 15. The coolant air is in relatively close passing contact with the interior surface of the coolant chamber and absorbs heat energy from the blade by convective heat transfer. Coolant air passing through the injection passage 5 will thereby be warmed within the chamber 3 and the warmed air then released or otherwise removed from the chamber 3 to render the component cooler.

Figure 4:
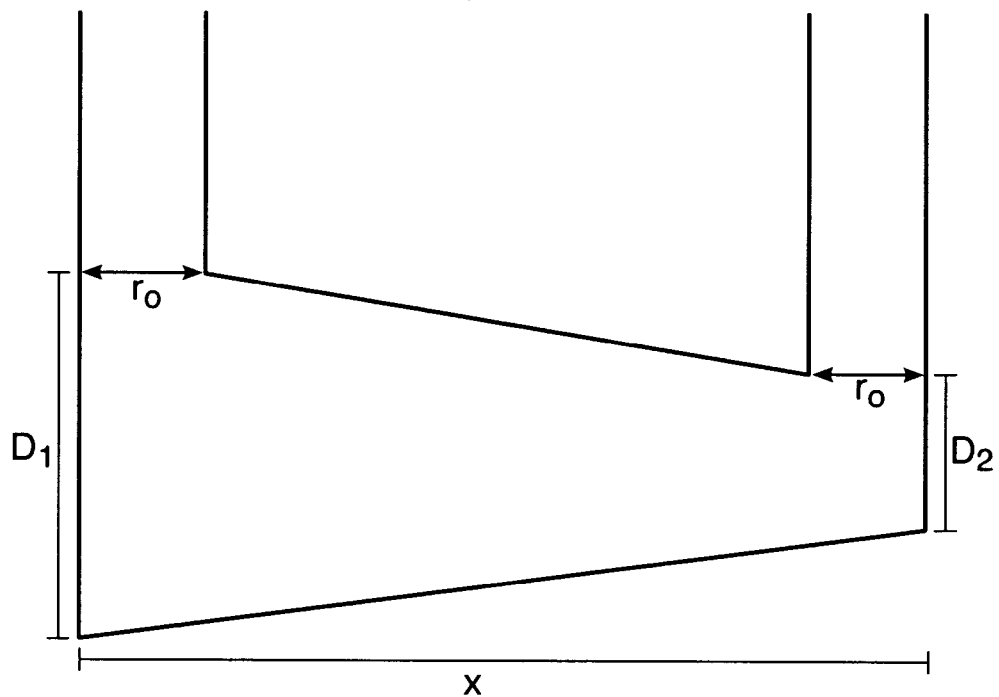
FIG. 4 is a schematic of a tapered chamber
Figure 5:
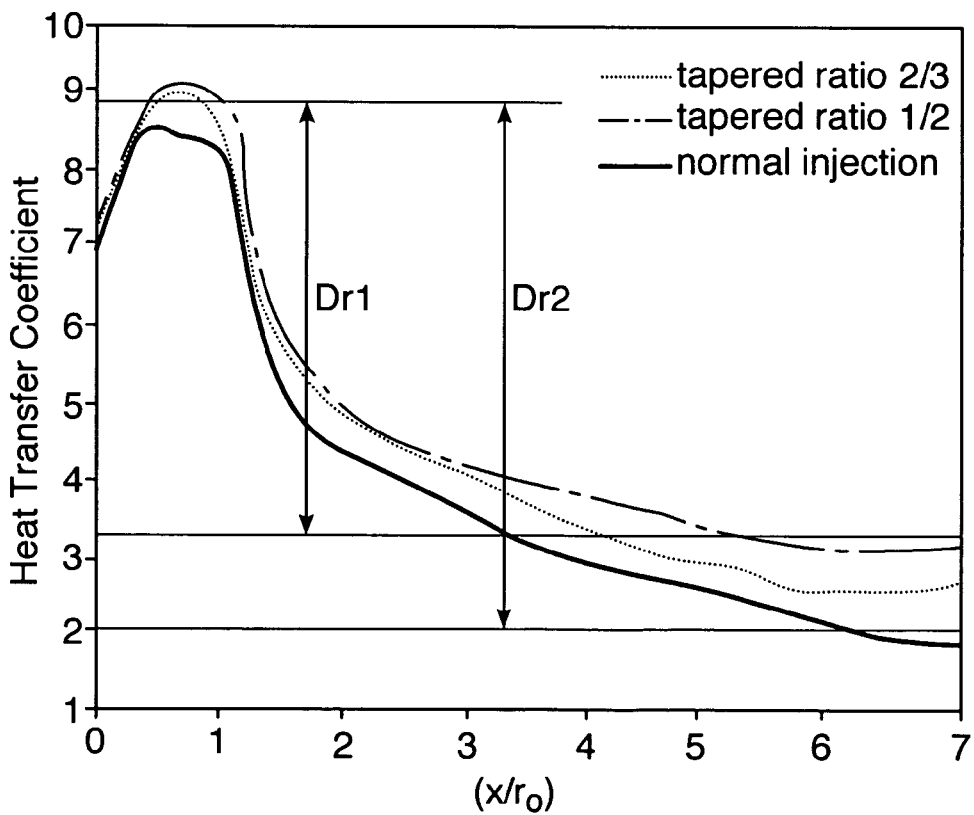
FIG. 5 is a graph detailing measurements of the heat transfer coefficient taken along the length of a tapered chamber described with reference to FIG. 4

FIG. 5 depicts the measurement derived heat transfer coefficient averaged around the passage perimeter for a tapered cooling chamber according to the present invention. The tapered cooling chamber being arranged as schematically depicted in FIG. 4.

Each of the cooling chamber inlet and outlets have a length $r_0$ in the direction of chamber elongation that is equal to $\frac{1}{7}^{th}$ of the height of the chamber i.e the length of the chamber x is $7r_0$. The chamber has a first hydraulic diameter $d_1$ and a second hydraulic diameter $d_2$. The ratio of the first hydraulic diameter to the second hydraulic diameter was varied, without altering the length of the chamber; x being equal to $2d_1$.

The graph of FIG. 5 depicts the measured values for the situation where $d_2/d_1=1$, $d_2/d_1=\frac{1}{2}$ and $d_2/d_1=\frac{2}{3}$. The Reynolds number is 20000.

Over the length of the chamber there is a drop in the Heat Transfer Coefficient, due primarily to the rise in temperature of the cooling air along the length. However, it has been determined that in the chamber of the present invention the heat transfer in the later part of the chamber i.e. furthest from the fluid inlet, is significantly enhanced by the presence of the taper. From FIG. 5, for normal injection the HTC was below 2 at the end of the chamber. In contrast, the HTC was nearly 3 when $d_2/d_1$ equalled ½. This represents an increase in nearly 40% and cooling is significantly enhanced. The heat transfer coefficient has been non-dimensionalised and normalised by the average heat transfer coefficient for non-swirling flow in the chamber at the same level of coolant flow.

A further embodiment of the present invention is described with reference to FIGS. 6 and 7. In this embodiment, the cooling chamber 3 is located deeper within the rotatable turbine blade 1. The blade has a root portion 110 and a tip portion 112 and the blade tapers up the span in both a chordwise extent and in maximum width. All features are cast in the blade, except for the film cooling holes 120, which may be machined.

A radial leading cooling passage 40 is provided. Cooling air is fed along the length of the passage from the root portion 110 of the blade 1. As there is a pressure differential between the cooling chamber 3 and the leading cooling passage 40, air enters the vortex cooling passage from the leading passage through passages 5 in the web 6. A jet is formed that flows around the inner surface 16 of the cooling chamber 3. The jet follows a cork-screw motion radially outwards on the surface of the cooling chamber 3.

Air may be injected at points further up the cooling chamber. Where this occurs the existing vortex jet lifts from the surface and becomes a radially outwards flow in the passage i.e. generally linear from the root portion 110 to the tip 112. By this means, fresh, colder air replaces the warmer air and ensures high efficiency cooling.

At the base of the coolant chamber, adjacent the fluid inlet, the chamber has a hydraulic diameter of $d_1$. At a distance 1 along the chamber, the chamber has a second hydraulic diameter of $d_2$.

It has been found that in situations where the function $d_1(1-0.6(\frac{1}{2}d_1)) <= d_2 <= d_1(1-0.15(\frac{1}{2}d_1))$ is satisfied, the taper angle is such that helical swirl is induced, and the swirl speed maintained along the length of the cooling chamber.

A separate trailing edge cooling passageway 4 is provided to cool the trailing edge 104.

A tip gallery 140 is provided into which air from the leading edge passageway 40, the trailing edge passageway 4 and the cooling chamber 3 is exhausted. These combine into a flow that exhausts from the trailing edge.

Figure 8:
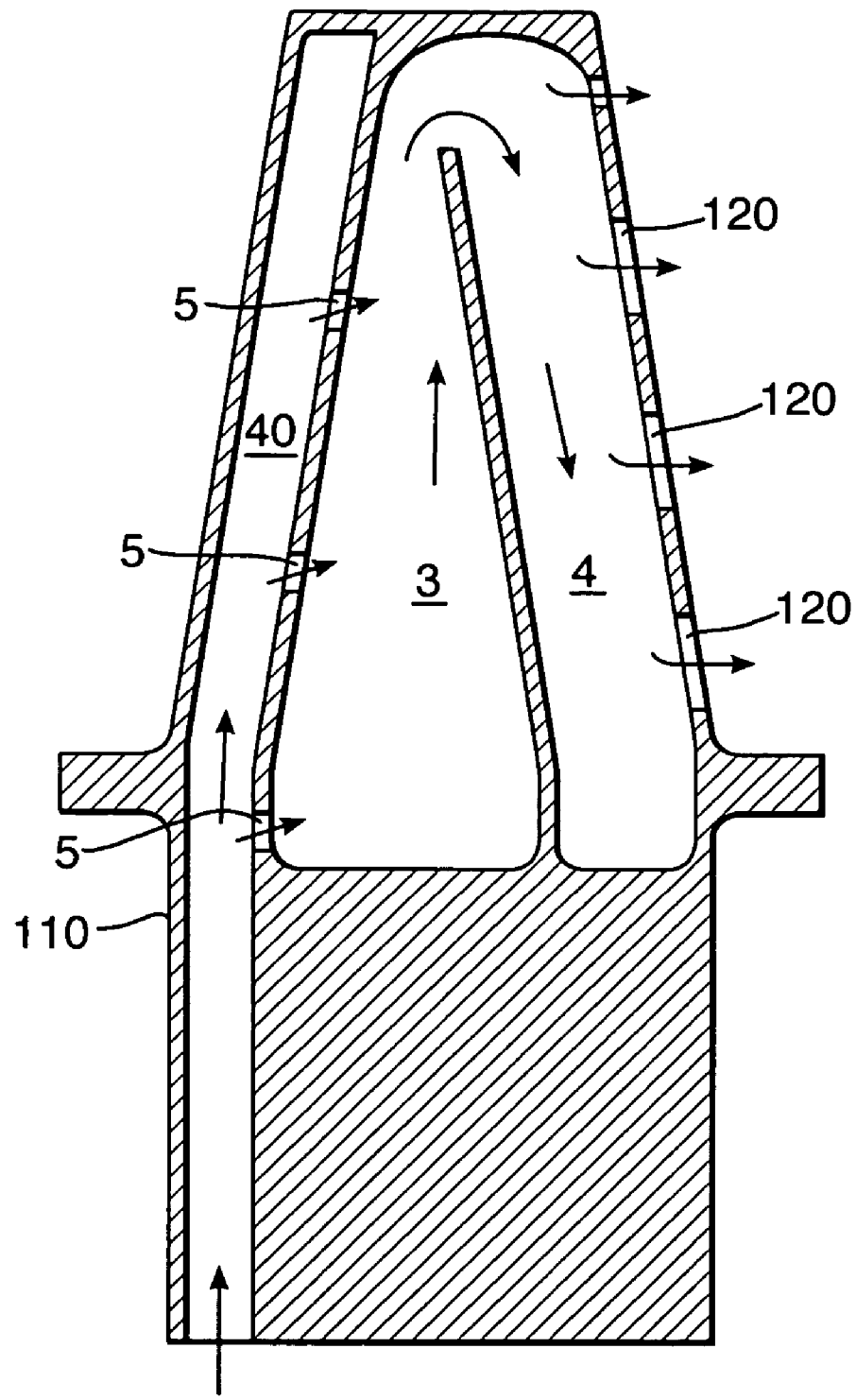
FIG. 8 is a schematic part plan cross-section of part of a turbine component in accordance with a third embodiment and consistent with that depicted in FIG. 6 in the direction C-C.

FIG. 8 depicts a further embodiment. The trailing edge passageway 4 is an extension of the cooling chamber 3. The flow of cooling air directed towards the tip is turned through 180° and directed, within the trailing edge passageway 4, towards the root and subsequently ejected through holes 120.

Less air is required than in the previous embodiment, thus the cooling efficiency of the system is higher.

Figure 9:
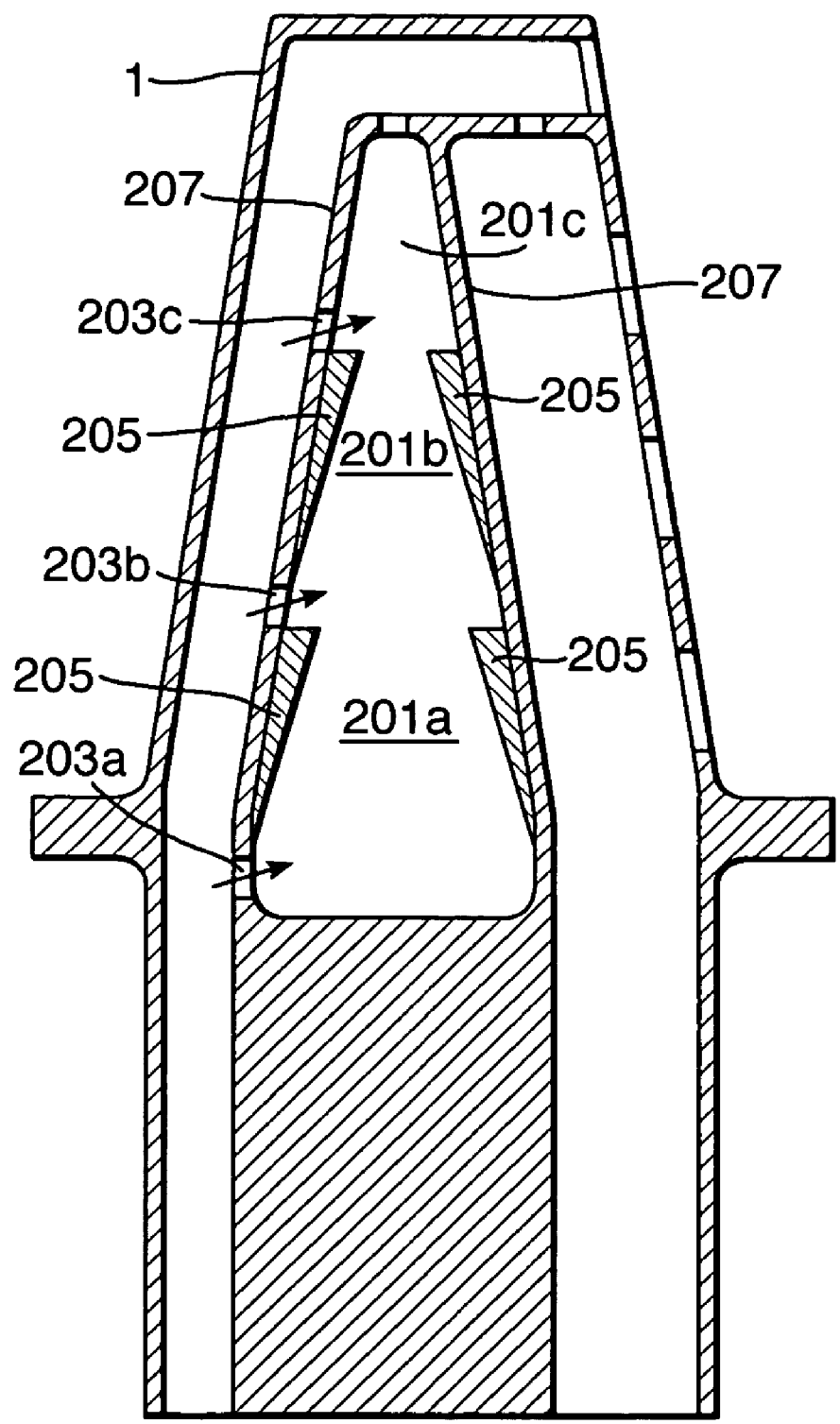
FIG. 9 is a schematic part cross-section of a portion of a turbine component in accordance with a fourth embodiment of the present invention.

FIG. 9 depicts a fourth embodiment of the present invention. The cooling chamber of a rotatable blade 3 is divided into three separate tapered portions 201a, 201b, 201c. Each tapered portion is provided with an inlet for cooling fluid 203a, 203b, 203c.

The tapers are formed by either inserts 205 attached to, or formed integrally with the wall 207 of the chamber, or by a naturally occurring taper of the wall 207 itself. The taper of portions 201a and 201b are formed through the provision of inserts 205; the taper of portion 201c is formed through the naturally occurring taper of the wall 207.

Cooling air is injected simultaneously and tangentially into each of the portions 203a, 203b, 203c. In the first portion, the taper induces a helical swirl such that the cool air remains attached to the inner surface of the portion. As the air travels along the portion towards the tip, its temperature increases. At the edge of the insert, closest to the tip of the blade 1, the warmer air detaches from the inner surface of the chamber.

Cooling air from the second inlet 203b is simultaneously being fed tangentially into the second portion closer to the insert surface than the air leaving the first portion. The air entering the second portion from the second inlet is colder than the air entering the second portion from the first portion. In this way, cooler air is adjacent the inner surface of the inset surface and consequently cooling efficiency is increased. Beneficially there is no significant mixing of the detached warmer air and the fresh cooler air. Mixing can reduce the efficiency of the system.

The transition between the second portion and the third portion is substantially of the same format as that between the first portion and the second portion.

Figure 10:
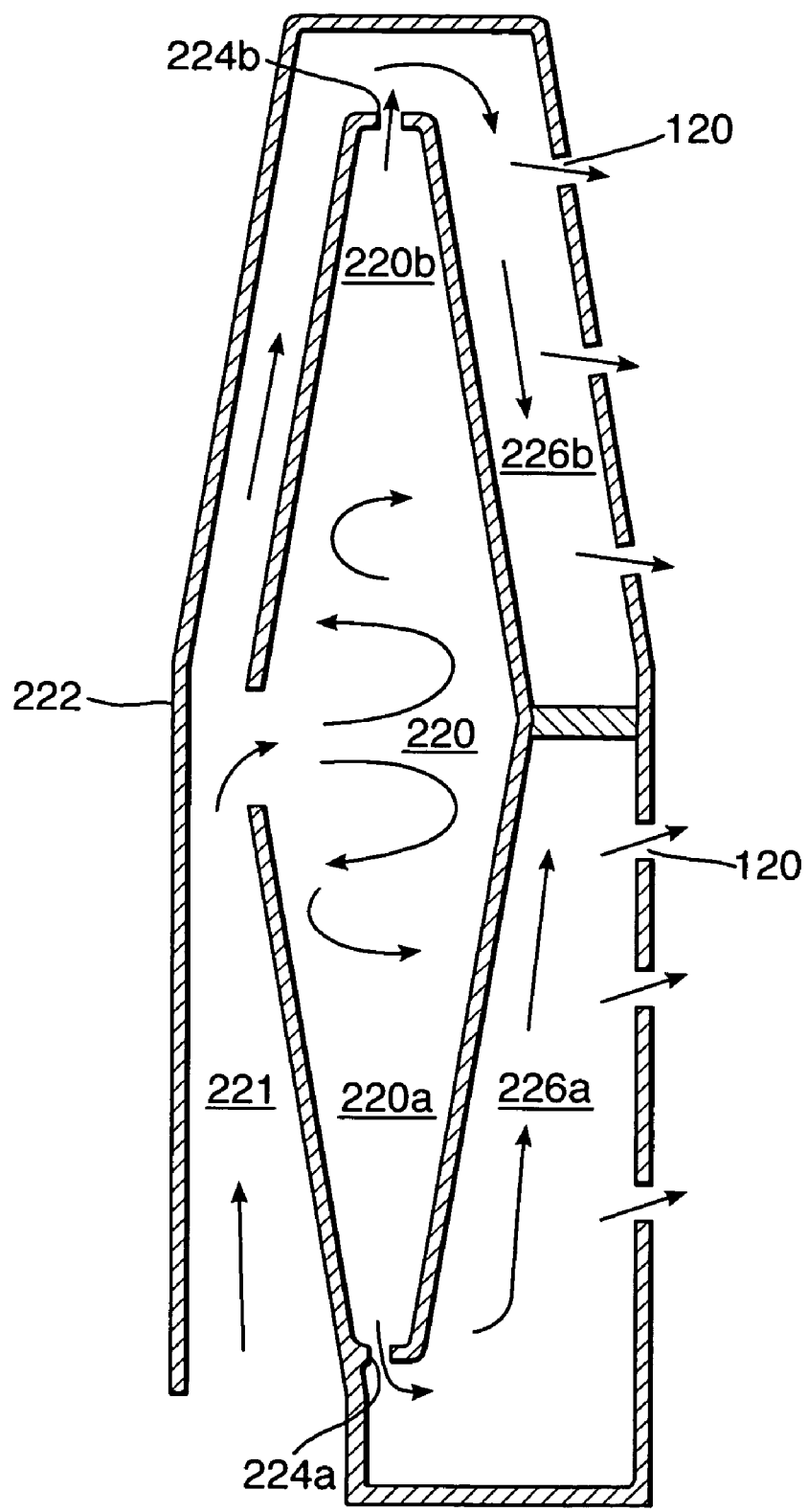
FIG. 10 is a schematic part cross-section of a portion of a turbine vane in accordance with a fifth embodiment of the present invention.

FIG. 10 depicts a fifth embodiment of the present invention. The component is a stator vane and therefore does not rotate as a blade. Since the vane is in a fixed arrangement, it is easier to produce a helical swirl that travels in a direction towards the axis of the engine. It is therefore possible, by providing appropriate tapers to induce helical swirl in a chamber that travels in opposing directions.

The chamber 220 is provided with a first tapered portion 220a and a second tapered portion 220b, the portions tapering in opposing directions. Air is injected from a supply channel 221, through port 222 and into the central portion of chamber 220. The flow is substantially tangential to the direction of chamber length and therefore swirls around the interior periphery of the chamber.

Each portion 220a, 220b therefore has adjacent the fluid inlet, has a hydraulic diameter $d_1$ and, at a distance 1 from the inlet, a second hydraulic diameter $d_2$ for portion 220a and $d_3$ for portion 220b. $d_2$ and $d_3$ may be identical or different.

It has been found that in situations where the function $d_1(1-0.6(\frac{1}{2}d_1)) <= (d_2,d_3) <= d_1(1-0.15(\frac{1}{2}d_1))$ is satisfied, the taper angle is such that helical swirl is induced, and the swirl speed maintained along the length of each of the portions.

At the end of each portion, remote from the inlet, air is exhausted from the chamber through exhaust ports 224a, 224b. This flow joins passages 226a and 226b in the trailing edge of the vane and exhausted from the component through holes 120.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A turbine component having a length extending between a root portion and a tip portion;
   said component having a coolant chamber extending in the direction of said component length;
   a fluid inlet arranged to feed fluid tangentially into said chamber;
   a fluid outlet arranged to remove fluid from said chamber;
   wherein the hydraulic diameter of the coolant chamber at a first point has a length $d_1$;
   wherein the coolant chamber, at a distance 1 along the chamber from the first point, has a hydraulic diameter $d_2$; and wherein $$d_1(1-0.6(\tfrac{1}{2}d_1)) <= d_2 <= d_1(1-0.15(\tfrac{1}{2}d_1))$$

wherein a fluid supply chamber is located adjacent a leading edge of the component, said fluid inlet arranged to conduct fluid between the fluid supply chamber and the coolant chamber.

2. A turbine component according to claim 1, wherein the first point is located at the fluid inlet.

3. A turbine component according to claim 1, wherein the fluid outlet is located along the chamber at a distance $>=2d_1$ from the fluid inlet.

4. A turbine component according to claim 1, wherein the fluid inlet is located towards the root of the component.

5. A turbine component according to claim 1, wherein the coolant chamber is located adjacent a leading edge of the component.

6. A turbine component according to claim 1, wherein the chamber comprises at least one further fluid inlet arranged with the first fluid inlet as an array extending in the direction of component length.

7. A turbine component according to claim 1, wherein the component is a turbine vane.

8. A turbine component according to claim 1, wherein the component is a turbine blade.

9. An engine including a turbine component as claimed in claim 1.

10. A turbine component having a length extending between a root portion and a tip portion;
- said component having a coolant chamber extending in the direction of said component length;
- a fluid inlet arranged to feed fluid tangentially into said chamber;
- a fluid outlet arranged to remove fluid from said chamber;
- wherein the hydraulic diameter of the coolant chamber at a first point has a length $d_1$;
- wherein the coolant chamber, at a distance 1 along the chamber from the first point, has a hydraulic diameter $d_2$; and wherein $$d_1(1-0.6(½d_1))<=d_2<=d_1(1-0.15(½d_1))$$

wherein the outlet opens into a gallery located at the component tip portion.

11. A turbine component having a length extending between a root portion and a tip portion;
- said component having a coolant chamber extending in the direction of said component length;
- a fluid in let arranged to feed fluid tangentially into said chamber;
- a fluid outlet arranged to remove fluid from said chamber;
- wherein the hydraulic diameter of the coolant chamber at a first point has a length $d_1$;
- wherein the coolant chamber, at a distance 1 along the chamber from the first point, has a hydraulic diameter $d_2$; and wherein $$d_1(1-0.6(½d_1))<=d_2<=d_1(1-0.15(½d_1))$$

wherein the coolant chamber forms part of a cavity, a splitter plate being provided that extends within the cavity in the direction of component length to divide the cavity into the coolant chamber and an exhaust chamber.

12. A turbine component having a length extending between a root portion and a tip portion;
- said component having a coolant chamber extending in the direction of said component length;
- a fluid inlet arranged to feed fluid tangentially into said chamber;
- a fluid outlet arranged to remove fluid from said chamber;
- wherein the hydraulic diameter of the coolant chamber at a first point has a length $d_1$;
- wherein the coolant chamber, at a distance 1 along the chamber from the first point, has a hydraulic diameter $d_2$; and wherein $$d_1(1-0.6(½d_1))<=d_2<=d_1(1-0.15(½d_1))$$

wherein the component is provided with at least one further coolant chamber having a fluid inlet and a fluid outlet disposed such that a fluid within the at least one coolant chamber flows substantially helically between the inlet and the outlet.

13. A turbine component having a length extending between a root portion and a tip portion, said component comprising a coolant chamber extending in the direction of component length;
- wherein said coolant chamber is subdivided into two or more tapered portions arranged in the direction of component length; and
- wherein each of the two or more tapered portions is provided a fluid inlet arranged to feed fluid tangentially into a respective portion.

14. A turbine component according to claim 13, wherein at least one of the tapered portions is provided with at least one further fluid inlet arranged with the first fluid inlet as an array extending in the direction of component length.

15. A turbine component according to claim 13, wherein the tapered portions are provided by a local thickening a wall of the chamber.

16. A turbine component according to claim 13, wherein the tapered portions taper in opposing directions.

17. A turbine component according to claim 16, wherein two tapered portions are provided and a fluid inlet feeds fluid simultaneously to the two tapered portions.

18. A turbine component according to claim 13, wherein the component is a turbine vane.

19. A turbine component according to claim 13, wherein the component is a turbine blade.

20. An engine including a turbine component as claimed in claim 13.

* * * * *